(No Model.)
I. A. F. WALLBERG & J. D. ULLGREN.
APPARATUS FOR STRAINING WOOD PULP, &c.
No. 581,498. Patented Apr. 27, 1897.
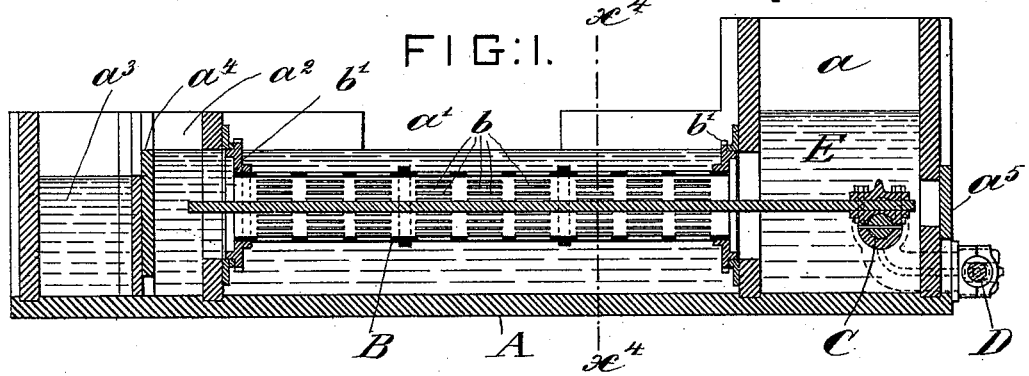
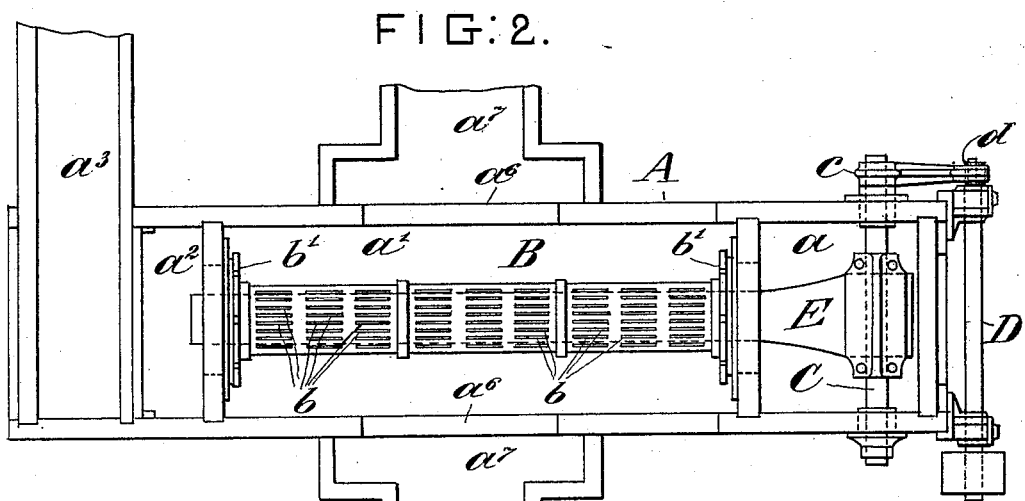
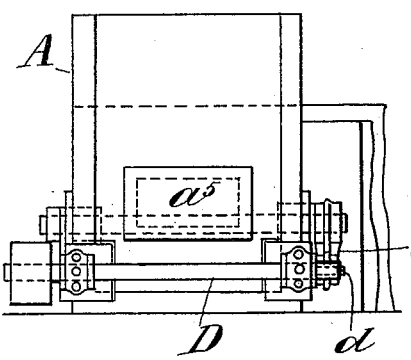
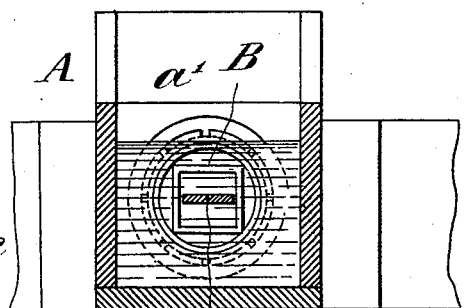
WITNESSES:
INVENTORS:
Ivar A. F. Wallberg
Johan D. Ullgren
By Henry Connett
Attorney.

UNITED STATES PATENT OFFICE.

IVAR AXEL FERDINAND WALLBERG, OF CARLSTAD, AND JOHAN DANIEL ULLGREN, OF VERMBOL, SWEDEN.

APPARATUS FOR STRAINING WOOD-PULP, &c.

SPECIFICATION forming part of Letters Patent No. 581,498, dated April 27, 1897.

Application filed August 13, 1896. Serial No. 602,600. (No model.)

*To all whom it may concern:*

Be it known that we, IVAR AXEL FERDINAND WALLBERG, residing at Carlstad, and JOHAN DANIEL ULLGREN, residing at Vermbol, near Katrineholm, Sweden, subjects of the King of Sweden and Norway, have invented certain new and useful Improvements in Apparatus for Straining Wood-Pulp and Similar Fibrous Materials, of which the following is a specification.

As its title indicates, our invention relates to straining wood-pulp and the like in order to separate therefrom the coarser particles or bits. In passing wood and other fiber held in suspension in water through sieves the difficulty has been that, owing to the flow being continuous in one direction, the sieves or strainers become clogged with the fiber and have to be cleared, and this is not easy to do where the sieves are inclosed in a chamber and not readily accessible.

With our apparatus we obviate the difficulty named by imparting to the current which flows through the straining apparatus a vibratory motion—that is, the current bearing the fibers is alternately forced forward and sucked or drawn back. The forward impulse tends to force the liquid and the finer particles held in suspension through the sieve and the backward impulse tends to draw away from the sieve the coarser particles which apply themselves to the sieve-surface and tend to choke or clog it. The to-and-fro motion imparted to the coarser debris thus keeps the interstices of the sieve open and clear and permits of the operation being continued for a long time without the necessity of removing the strained-out substance.

In the accompanying drawings we have shown an embodiment of an apparatus constructed according to our invention.

In the drawings, Figure 1 is a longitudinal vertical section of the apparatus. Fig. 2 is a plan thereof. Fig. 3 is an end elevation showing the right-hand end as seen in Figs. 1 and 2; and Fig. 4 is a transverse section at the point indicated by line $x^3$ in Fig. 1.

The apparatus comprises an elongated trough or receptacle A, which may be of wood or metal and which is divided into compartments $a$, $a'$, $a^2$, and $a^3$. In the longer compartment $a'$ is fixed a longitudinally-extending strainer B, in the form of a tube and here shown as square in cross-section. The walls or sides of this strainer B are composed wholly or in part of sieve or strainer plates having in them perforations preferably in the form of narrow slits $b$. It is not necessary that the whole surface of the tube be thus perforated; but we prefer to so perforate it. The tube B will be, by preference, supported at its respective ends in the partitions between the long compartment $a'$ and the compartments $a$ and $a^2$, being provided at its ends with bearing-flanges $b'$, supported in corresponding bearings in said partitions. These flanges are of ring form, so that the tube B may be turned axially to afford access to its sides the more readily.

In the compartment $a$ is mounted in suitable bearings a shaft C, which may have imparted to it a rocking or oscillating movement through the medium of a crank or arm $c$ on said shaft, an eccentric $d$ on a driving-shaft D, and a forked yoke in the end of the arm $c$ embracing said eccentric $d$.

On the rock-shaft C is clamped a springy plate E, which extends into the tube B, as clearly shown in Figs. 1 and 4. This plate E may be of wood or metal.

So far as described the operation of the apparatus is as follows: The fibrous mass, suspended in fluid, is poured into the compartment $a$, whence it flows into the tube B with a velocity proportioned to the head and to the quality or condition of the fluid mass. The fluid will flow with a speed proportioned to its distance from the surface of the strainer-tube B by reason of its friction on the inner surface of the tube. As a consequence of this, the fibers come to lie in the direction of the longitudinal axis of the tube B and the slits $b$ therein. By the vibration of the plate E the floating fibrous mass is alternately driven against the sieve-surface and drawn away therefrom, whereby those fibers which can pass through the slits $b$ do so and those which cannot, or do not, pass on through the tube into the compartment $a^2$ and thence over the overflow-lip $a^4$ into the last or outlet compartment $a^3$. The screened pulp passes over overflow-lips $a^6$ in the sides of the compartment $a'$ into suitable troughs or receptacles $a^7$, as clearly shown.

By varying the thickness of the plate E and the speed of the shaft D the undulatory or vibratory motion may be varied and adapted to suit the purpose in view. The velocity of the flow through the tube B can be varied by varying the head or level in the compartment $a$.

The compartment $a$ may have a door $a^5$ to facilitate the insertion of the plate E, and the compartment $a'$ may have adjustable overflow-lips at its sides.

Having thus described our invention, we claim—

1. In an apparatus for straining wood-pulp and similar fiber held in suspension in a liquid, the combination with a strainer in the form of a tube, through which the liquid flows, of a laterally-vibrating plate E, extending through said strainer, substantially as and for the purpose set forth.

2. In an apparatus for straining wood-pulp and similar fiber held in suspension in a liquid, the combination with the trough A, having compartments $a$, $a'$, $a^2$ and $a^3$, of the strainer B, mounted in the compartment $a'$, the plate E in and extending through the strainer B, and means substantially as described for imparting vibration to said plate, as set forth.

In witness whereof we have hereunto signed our names in the presence of two subscribing witnesses.

IVAR AXEL FERDINAND WALLBERG.
  JOHAN DANIEL ULLGREN.

Witnesses:
  ERNST SVANQVIST,
  CARL P. GERELL.